United States Patent [19]

Feintuch

[11] Patent Number: 4,815,012

[45] Date of Patent: Mar. 21, 1989

[54] APPARATUS AND METHOD FOR REAL TIME RECONSTRUCTION OF DIGITAL MAP DATA

[75] Inventor: Martin Feintuch, Fort Lee, N.J.

[73] Assignee: Allied-Signal Inc., Morris Township, Morris County, N.J.

[21] Appl. No.: 826,394

[22] Filed: Feb. 5, 1986

[51] Int. Cl.[4] ........................ G06F 15/66; G06F 3/153

[52] U.S. Cl. .................................... 364/521; 364/443; 358/103; 340/995

[58] Field of Search ............... 364/443, 444, 449, 521; 73/178 R; 340/988, 990, 995, 996; 342/450, 451; 358/103

[56] References Cited

U.S. PATENT DOCUMENTS

| | | | |
|---|---|---|---|
| 4,400,727 | 8/1983 | Aron | 358/103 |
| 4,484,192 | 11/1984 | Seitz et al. | 364/449 |
| 4,527,155 | 7/1985 | Yamaki et al. | 340/990 |
| 4,602,251 | 7/1986 | Sawada et al. | 340/995 |
| 4,630,209 | 12/1986 | Saito et al. | 340/996 |
| 4,660,157 | 4/1987 | Beckwith et al. | 358/103 |
| 4,675,676 | 6/1987 | Takanabe et al. | 364/449 |

*Primary Examiner*—Gary Chin

*Attorney, Agent, or Firm*—Howard G. Massung

[57] ABSTRACT

Apparatus and method for real time reconstruction of digital map data are disclosed, wherein symbology commands representing the total area covered by a map are stored in bulk in compressed form. A symbol generator draws the symbology commands into a working memory device having a plurality of memory components, each of which is equivalent to a local display area. The memory components are received by a display memory device which contains an element by element digital representation of a map picture for conversion into video signals for driving a display device to display the map picture.

12 Claims, 2 Drawing Sheets

APPARATUS AND METHOD FOR REAL TIME RECONSTRUCTION OF DIGITAL MAP DATA

BACKGROUND OF THE INVENTION

Present day aircraft cockpit display systems include navigational maps. These maps may be film strip projected, film strip to video converted, or digitally stored to video converted.

Film strip projected maps feature a standard 35 mm film strip which is viewed directly by the pilot of the aircraft through an optical arrangement. The film strip is mechanically translated and rotated.

Film strip-to-video converted maps feature a standard 35 mm film strip which is illuminated with a small spot of light scanning the film strip with a standard TV raster (flying spot scanner). Light transmitted through the film strip is an instantaneous function of the map image and is converted to video signals. The video signals are used to display the map on a multi-function cockpit display device. An arrangement of this type is advantageous in that it can be located remote from the cockpit. The film strip is mechanically translated and rotation is achieved electronically.

Digitally stored to maps for video conversion feature digitally storing the map in a bulk storage memory rather than optically on a film strip. Digital signals are provided and are converted via a digital to video converter to video signals which are used to display the map on a multi-function cockpit display device. The bulk storage to video arrangement can also be located remote from the cockpit. Map translation is achieved by changing the starting address of the bulk storage memory and map rotation is achieved by electronic rotation of the digital to video converter.

In order to display the map in real time the bulk storage memory is typically downloaded into a refresh memory from which the video signals are provided. An arrangement of this type is advantageous over the film strip arrangements heretofore described in that moving parts are not required.

In prior art digitally stored to maps for video conversion systems the maps are stored element by element in the bulk storage memory. An exorbitant amount of memory is required in order to achieve the same resolution as that achieved with film strip systems. The amount of memory can be reduced by storing only non-redundant digital map data. However, in this event a real time reconstruction arrangement is required.

Accordingly, it is the object of the present invention to provide apparatus and method for real time reconstruction of digital map data for use in association with a digitally stored to video converted map system, whereby the amount of memory required to store the map information is significantly reduced.

SUMMARY OF THE INVENTION

This invention contemplates apparatus and method for real time reconstruction of digital map data, wherein a bulk storage device contains in compressed form symbology commands representing the total area covered by a map. A symbol generator is controlled by a central processing unit (CPU) for receiving the symbology commands from the bulk storage device and at the appropriate time drawing a desired map picture into a working memory device which is divided into a plurality of memory components. Each of the plurality of memory components corresponds to a local map display area. The working memory device is controlled by the CPU to transfer the memory components to a display memory device, whereupon the display memory device contains element by element digital data corresponding to the desired map picture. A digital to video converter receives the digital data and is addressed by the CPU for converting said digital data to video signals which are used for displaying the map picture.

DETAILED DESCRIPTION OF THE INVENTION

Figure 1:
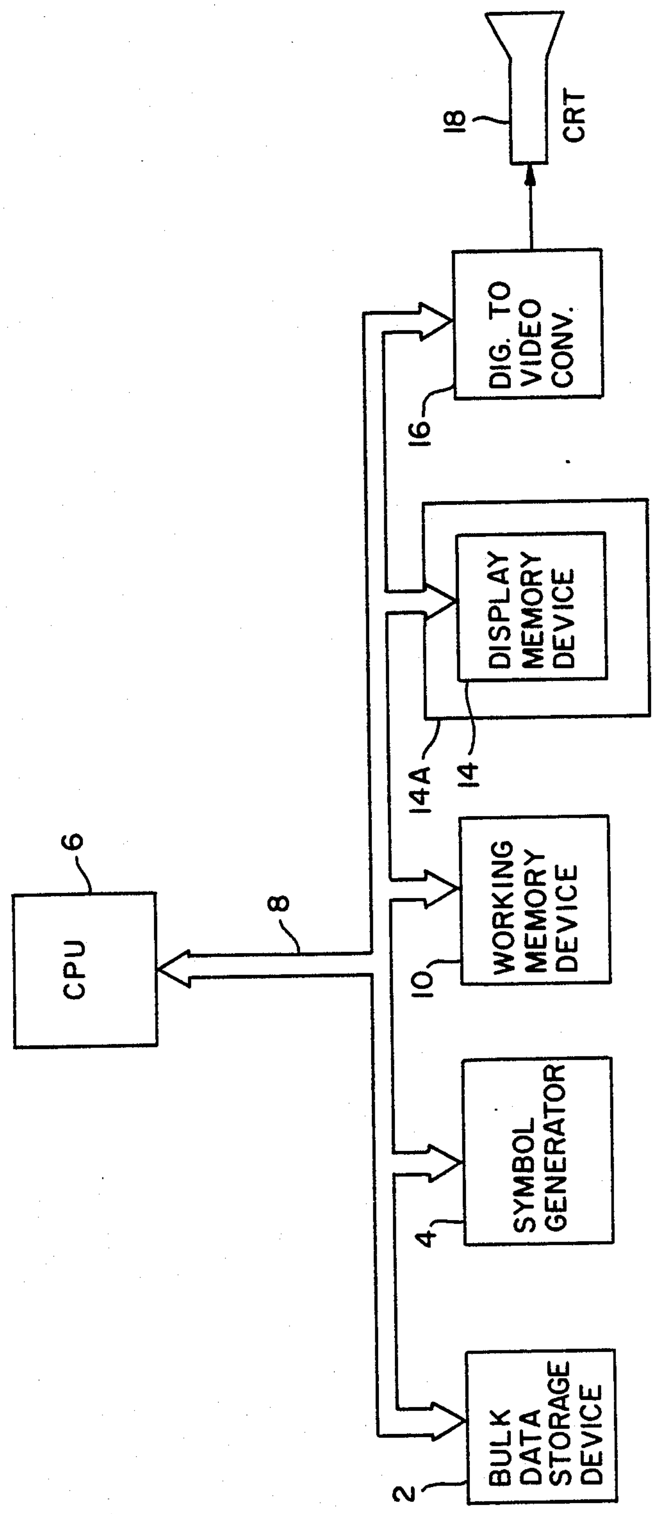
FIG. 1 is a block diagram representation illustrating the invention.

With reference to FIG. 1, a bulk data storage device designated by the numeral 2 contains digital symbology commands which represent the total area, in compressed form, of a map such as may be used for aircraft navigational purposes. Bulk data storage device 2 may be, for example, a magnetic disc.

Bulk storage device 2 is connected to a symbol generator 4. Symbol generator 4 is controlled by a central processing unit (CPU) 6 via an input/output bus 8 for receiving, at appropriate times, the digital symbology commands from bulk storage memory device 2 and for drawing a desired digital map picture into a working memory device 10. Thus, working memory device 10, which may be a random access memory (RAM), contains digital data in uncompressed form corresponding to the desired map picture. Symbol generator 4 may be of a type such as marketed by the Intel Corporation as their 82786 CHMOS Graphics Co-Processor as described in their information sheet relating to same.

Working memory device 10 is divided into a plurality of memory components, each equivalent to a particular local map display area as will be further described with reference to FIGS. 2 and 3.

Working memory device 10 is controlled by CPU 6 via bus 8 to transfer the digital data contained therein to a display memory device 14 which may also be a random access memory (RAM).

In this connection it is noted that the aforenoted arrangement of working memory device 10, wherein the working memory device is divided into a plurality of components, each equivalent to a local map display area, permits the apparatus of the invention to function transient free and in real time. The number of memory components and their size is commensurate with the speed of the aircraft and the scale of the map, and is not to be considered as a limitation of the invention.

Thus, display memory device 14 contains element by element digital data corresponding to a desired map picture, and which digital data is received by a digital to video converter 16. Digital to video converter 16 is addressed by CPU 6 via bus 8 for converting the received digital data to video signals which are applied to a cathode ray tube 18 for displaying the map picture in a multi-function cockpit display, as the case may be.

With reference to display memory device 14, an overlap region 14A is provided therein to accommodate desired display rotation without losing map information.

With reference to digital to video converter 16, the addressing arrangement via CPU 6 is such that as the aircraft moves the starting address of display memory device 14 is moved in a corresponding direction. Further, element by element images representing a row or column of the memory components arranged as shown in FIGS. 2 and 3 no longer within the map coverage area are replaced by working memory device 10 by those images corresponding to the area just coming into view. With the arrangement described, no loss of map information is experienced as symbol generator 4 apparently goes beyond the address space.

Figure 2:
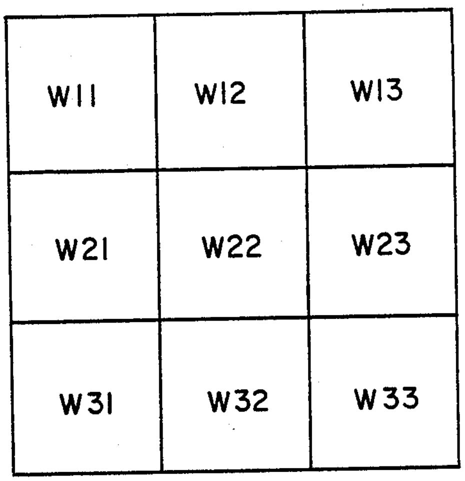
FIG. 2 is a diagrammatic representation illustrating one form of a working memory device shown generally in FIG. 1.

With reference to working memory device 10, as shown in FIG. 2 the device has three rows and three columns of memory components W11 to W33. Initially, symbol generator 4 draws into memory component W22 the area immediately surrounding the present position of the aircraft which in turn is transferred as a local display area to display memory device 14. Symbol generator 4 will then draw into the remaining memory components the area surrounding the local display area. As the aircraft moves appropriate rows and components are transferred to display memory device 14 to provide the map picture.

Symbol generator 4 ceases its drawing function until the aircraft passes a memory component boundary, at which time the nonactive memory components will be updated. For example, if the W22/W23 memory component boundary is passed, then memory components W11, W21 and W31 will be updated. Similarly, if the W22/W12 memory component boundary is passed, then memory components W31, W32 and W33 will be updated. With this arrangement symbol generator 4 has as much time to update the dormant memory components as it takes the aircraft to transcend one memory component.

Figure 3:
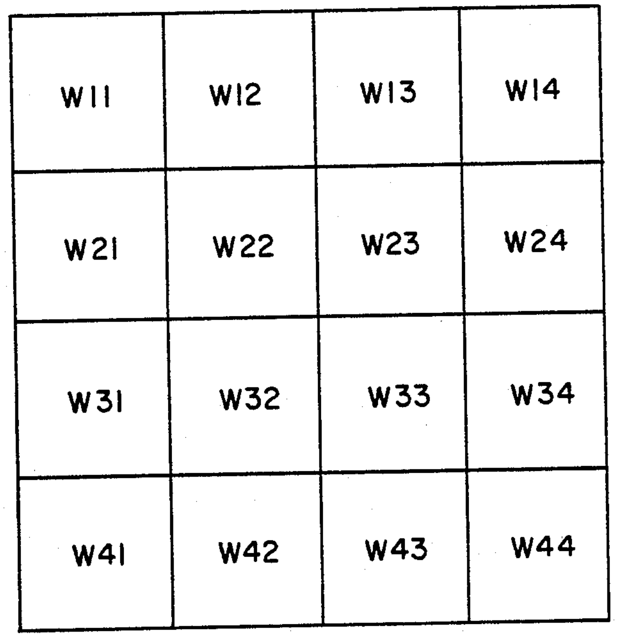
FIG. 3 is a diagrammatic representation illustrating another form of the working memory device.

An alternative memory arrangement is illustrated in FIG. 3, wherein four columns and four rows of memory components are shown. Each component is equal to one-fourth of the local display area. With the arrangement shown in FIG. 3 the operation is the same as that previously described with reference to FIG. 2 except that four memory blocks, each one-fourth that of the previous arrangement (FIG. 2), will be updated at a boundary crossing, instead of three, and these crossings will occur twice as often.

As to working memory device 10, shown generally in FIG. 1 and more particularly in FIGS. 2 and 3, the random access memory device can be logically configured via CPU 6 into rectangular arrays of a predetermined height and width over a wide memory range, and in this regard reference is made to catalog 611-0001-0-A entitled "Vicom Digital Image Processor" published by Vicom Systems Inc., San Jose, Calif., and to catalog D459 entitled "Image Manipulator" published by Ampex Corporation, Redwood City, Calif.

There has thus been described apparatus and method whereby symbology commands representing, in compressed form, the total area covered by an aircraft navigational map or the like are received by a symbol generator which draws a desired map picture into a working memory device. The working memory device is divided into a plurality of memory components, each of which is equivalent to a local map display area. The memory components are transferred to a display memory device which thereby contains an element by element digital representation of the map picture. This digital representation is converted to video signals for driving a cathode ray tube which displays the map picture.

With the aforegoing description of the invention in mind, reference is made to the claims appended hereto for a definition of the scope of the invention.

What is claimed is:

1. Apparatus for real time reconstruction of digital map data, characterized by:

bulk storage means for storing in compressed form symbology commands representing the total area covered by a map;

controlling means;

working memory means connected to the controlling means;

a symbol generator connected to the bulk storage means, the controlling means and the working memory means, and controlled by the controlling means for timely receiving the symbology commands from the bulk storage means and for thereupon drawing a desired digital picture of the map into the working memory means, whereby the working memory means contains digital data in uncompressed form corresponding to the desired digital map picture;

display memory means connected to the working memory means;

the working memory means being divided into a plurality of memory components, each of which is equivalent to a local map display area, said controlling means automatically updating an adjacent memory component wherever the passing of the boundary between two consecutive memory components is detected by said controlling means, whereby the apparatus functions transient free in real time, and said divided working memory means controlled by the controlling means for transferring the desired digital map picture to the display memory means which provides digital signals corresponding to said map picture; and means connected to the display memory means and to the controlling means and controlled by the controlling means for converting the digital signals to video signals which are used for providing a desired map picture display.

2. Apparatus as described by claim 1, further characterized by:

the map being used for navigating a moving vehicle; and the number and size of the memory components being commensurate with the speed of the moving vehicle and the scale of the map.

3. Apparatus as described by claim 1, further characterized by:

the working memory means is controlled by the controlling means for transferring the desired digital map picture to the display memory means, whereby said display memory means contains element by element digital data corresponding to the desired map picture.

4. Apparatus as described by claim 1, further characterized by:

the display memory means including an overlap region to accommodate map picture display rotation without losing map information.

5. Apparatus as described by claim 1, characterized by:

the map being used for navigating a moving vehicle; and the means for converting the digital signals to video signals is addressed by the controlling means so that as the vehicle moves the starting address of the display memory means moves in a corresponding direction.

6. Apparatus as described by claim 1, further characterized by:

the map being used for navigating a moving vehicle;

the symbol generator initially drawing into a particular memory component of the working memory means a desired map picture of the area of the map immediately surrounding the present position of the vehicle for transfer as a particular local map display area to the display memory means, and thereafter storing into the remaining memory components the map area surrounding said particular local map display area; and appropriate memory components being transferred to the display memory means as local map display areas as the vehicle moves for providing the digital signals corresponding to the map picture.

7. A method for real time reconstruction of digital map data, characterized by:

storing in compressed form symbology commands representing the total area covered by a map;

timely receiving the symbology commands for drawing a desired digital picture of the map, and providing digital data in uncompressed form corresponding to the desired map picture;

transferring the desired digital map picture to a display memory means for providing corresponding digital signals, including dividing a working memory means into a plurality of memory components, each of which is equivalent to a local map display area, automatically updating an adjacent memory component wherever the passing of the boundary between two consecutive memory components is detected for reconstructing the digital map data transient free in real time, and controlling said divided working memory means for transferring the digital map picture to the display memory means;

converting the digital signals to video signals; and using the video signals for providing a desired map picture display.

8. A method as described by claim 7, further characterized by:

using the map for navigating a moving vehicle; and providing the plurality of memory components in number and size commensurate to the speed of the moving vehicle and the scale of the map.

9. A method as described by claim 7, further characterized by:

said transferring the desired digital map picture to the display means including providing element by element digital data corresponding to the desired digital map picture.

10. A method as described by claim 7, further characterized by:

accommodating map picture display rotation without losing map information.

11. A method as described by claim 7, further characterized by:

using the map for navigating a moving vehicle; and converting the digital signals to video signals, wherein said digital to video conversion commensurate with the direction of movement of the moving vehicle.

12. A method as described by claim 7, further characterized by:

using the map for navigating a moving vehicle;

timely receiving the symbology commands for generating an image corresponding to an area of the map immediately surrounding the present position of the vehicle;

said transferring of the desired digital map being prepared on symbology commands corresponding to a particular local map display area, and thereafter displaying the map area surrounding said particular local map display area; and as the vehicle moves, transferring appropriate local map areas for providing corresponding digital signals.

* * * * *